United States Patent [19]

Pape

[11] 4,289,170

[45] Sep. 15, 1981

[54] COMPONENT SUBJECTED TO THERMAL STRESSES AND HAVING PARTS FOR INTENDED BREAKAGE

[75] Inventor: Karl Pape, Wolfsburg, Fed. Rep. of Germany

[73] Assignee: Volkswagenwerk AG, Wolfsburg, Fed. Rep. of Germany

[21] Appl. No.: 95,935

[22] Filed: Nov. 20, 1979

[30] Foreign Application Priority Data

Nov. 22, 1978 [DE] Fed. Rep. of Germany ....... 2850614

[51] Int. Cl.³ .................... D03D 13/00; F01N 7/00; F28F 7/00; B65D 65/28
[52] U.S. Cl. ................................. 138/117; 60/322; 60/323; 138/37; 165/81; 220/89 A; 285/4; 285/187; 428/43; 428/167
[58] Field of Search .............. 138/111, 115, 116, 117, 138/37, 38, 39; 60/322, 323; 285/2, 3, 4, 187; 165/87; 428/43, 64, 65, 131, 167; 220/89 A

[56] References Cited

U.S. PATENT DOCUMENTS

| | | | |
|---|---|---|---|
| 3,798,903 | 3/1974 | Mitchell et al. | 285/187 |
| 3,864,909 | 2/1975 | Kern | 60/323 |
| 4,097,071 | 6/1978 | Crawford et al. | 285/187 |
| 4,188,784 | 2/1980 | Hall | 60/323 |

FOREIGN PATENT DOCUMENTS

2710357 9/1978 Fed. Rep. of Germany .

Primary Examiner—Steven L. Stephan
Attorney, Agent, or Firm—Spencer & Kaye

[57] ABSTRACT

A wall-like component which is supported at opposite ends and exposed to thermal stresses has an elongated bilateral enlargement extending substantially parallel to a plane in which the component lies. The enlargement is oriented substantially perpendicularly to an imaginary distance line between the opposite ends. An elongated cavity extends within and codirectionally with the enlargement. The cavity is offset with respect to the enlargement in the direction of one of the ends of the component. The cavity further has a dimension—measured in a direction perpendicular to the plane of the component—which is greater than the thickness of a component portion adjoining the enlargement. As a result, upon breakage of parts of the enlargement under the effect of forces derived from heat-caused expansion of the material of the component, there is obtained a free edge of the component portion and a trough-like part formed together by remaining parts of the enlargement and the cavity for receiving the free edge.

4 Claims, 3 Drawing Figures

COMPONENT SUBJECTED TO THERMAL STRESSES AND HAVING PARTS FOR INTENDED BREAKAGE

BACKGROUND OF THE INVENTION

This invention relates to a wall-like or web-like structural component which, in service, is exposed to thermal stresses and which is supported at opposite ends. Such a structural component may be, for example, an intermediate wall in a multi-passage pipe of an exhaust system which may be associated with an internal combustion engine. It is noted that a wall-like or web-like structural component of the above-outlined type may generally find advantageous application where such a component—whether straight or curved—is exposed to compression stresses due to thermal expansion. Due to heat-caused expansion, such a component, with its opposite ends, exerts pressure on an adjacent structural component, thus risking impermissible deformations or unchecked destruction of one of the components.

For demonstrating the problem underlying the invention, a multi-passage pipe of an exhaust system will now be considered, such as disclosed, for example, in German Laid-Open Application (Offenlegungsschrift) No. 2,710,357. In the inside of the exhaust pipe there is provided a separating wall (hereafter "septum") which divides the inner space of the pipe into two separate flow passages. During the operation of the internal combustion engine with which the exhaust system is associated, the septum is heated to a substantially greater extent by the hot exhaust gases than the outer pipe wall which—in case of an internal combustion engine installed in an automotive vehicle—is cooled by an air stream during travel. The septum which thus constitutes the type of structural component with which the invention is concerned, seeks to expand and to thus increase the distance between its two ends connected with the outer pipe wall; this leads to an impermissible deformation of the cross-sectional configuration of the pipe. It is particularly troublesome if such deformation occurs at a location where an articulation for an additional pipe is provided.

SUMMARY OF THE INVENTION

It is an object of the invention to provide an improved structural component of the above-outlined type wherein, while retaining the basic functional characteristics, undesired deformations or unchecked breakages during thermal stresses are avoided.

If the structural component is a wall, the function of the component is primarily a separation of the spaces or passages situated at either side of the wall. In case of an intermediate wall (septum) in a multi-passage pipe, the purpose of the septum is to separate the two passages (channels) from one another. If the structural component is a web, then its function is to provide a support to thus take up forces in the direction of a connecting line between the two oppositely located ends.

As noted above, the inventive arrangement is such that the above-noted basic functions remain substantially unaffected.

These objects and others to become apparent as the specification progresses, are accomplished by the invention, according to which, briefly stated, the structural component has, between the opposite ends, an elongated bilateral enlargement which extends along the plane of the component and substantially transversely to an imaginary distance line between the ends. The enlargement (or thickened portion) encloses an elongated cavity which is codirectional with the enlargement and which, with respect to the thickened portion, is offset in the direction of one of the ends of the component. Further, the dimension of the cavity measured perpendicularly to the plane of the structural component is greater than the thickness of the adjoining zone of the structural component so that the cavity, after breakage of the material between the cavity and the outer face of the enlargement due to thermal stress, constitutes a receiving trough for an edge which is obtained by the breakage and which forms part of the zone adjoining the enlargement.

By means of the enlarged portion and the cavity offset with respect thereto, coupled with the dimension of the cavity relative to the thickness of the adjoining zone of the structural component there are provided intended locations of breakage which are exposed to bending stresses when heated. In case of a web or a wall which has a supporting function, the edge obtained by the breakage may engage the base of the cavity. Since the edge is partially surrounded by the cavity, the structural component continues to remain relatively impervious.

DESCRIPTION OF THE PREFERRED EMBODIMENT

Figure 1:
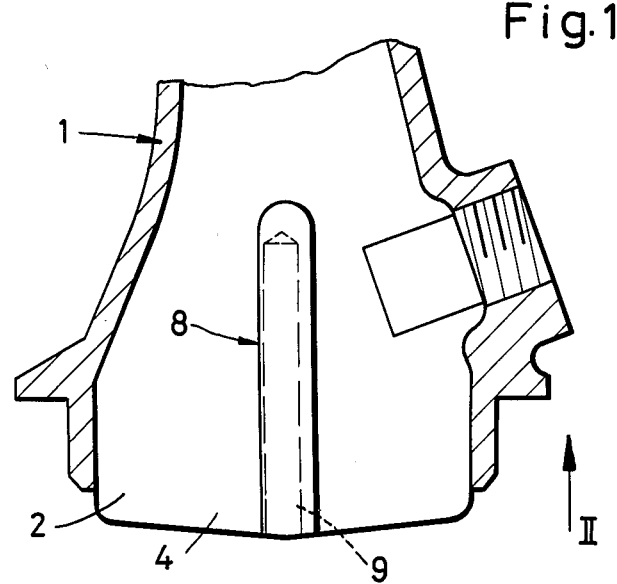
FIG. 1 is an axial sectional view of a preferred embodiment of the invention.
Figure 2:
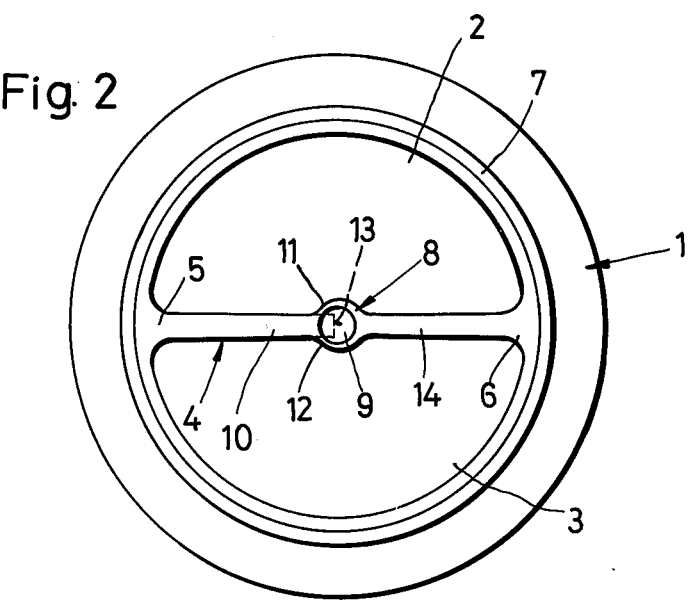
FIG. 2 is an end view of the preferred embodiment taken in the direction of the arrow II of FIG. 1.

Turning now to the FIGS. 1 and 2, the preferred embodiment illustrated therein may find application, for example, in the exhaust system of an internal combustion engine. The exhaust gases flow in the direction of the arrow II from a non-illustrated exhaust pipe coupled with the internal combustion engine. The exhaust gases enter from the exhaust pipe into a pipe 1 which has a plurality of passages in its inlet portion, because for reasons of efficiency it is a requirement that the exhaust gases be divided into a plurality of branch flows at least along a portion of their traveling path. Thus, the pipe 1 is subdivided longitudinally into two flow passages 2 and 3 by means of a septum 4, structured according to the invention.

As particularly well seen in FIG. 2, the ends 5 and 6 of the septum 4 merge into the external wall 7 of the pipe 1 with the usual rounded corners; the septum 4 and the external wall 7 form a one-piece component.

As soon as exhaust gases flow through the passages 2 and 3, particularly the septum 4 which is in contact bilaterally with the hot exhaust gas, is substantially heated. As a result, the septum 4 expands between its ends 5 and 6 and thus tends to cause the pipe 1 to assume a cross-sectional configuration which deviates from the predetermined circular shape. During such expansion uncontrollable breakages may also occur. Such undesired occurrences are prevented by the structure according to the invention now to be described.

In its mid zone the septum 4 is provided with a bilateral, elongated enlargement 8 as well as an elongated cavity 9 extending within the enlargement 8. While the cavity 9 is situated at the half point of the distance between the two ends 5 and 6 of the septum 4, the enlargement 8 is somewhat offset towards the septum end 6. In the illustrated embodiment both the enlargement 8 and the cavity 9 have throughout a circular cross section. The diameter of the cavity 9, or, more generally, its dimension measured perpendicularly to the plane of the septum 4, is greater than the thickness of the adjoining zone 10 of the septum 4. At the locations 11 and 12 thus material zones of reduced cross section are provided which are intended locations of breakage and which, upon heating the septum 4, are destroyed by the forces derived from bending moments.

By virtue of the above-noted breakage at the locations 11 and 12, there is obtained a free edge 13 of the zone 10 which penetrates into the now generally trough-shaped cavity 9, so that a substantially gastight separation of the two channels 2 and 3 is continued to be maintained. Thus, excessive stresses on the pipe wall 7 cannot occur, in view of the now telescoping arrangement of the septum 4.

It is to be understood that the invention is not limited to the use of accurately planar intermediate walls or webs. Further, the thickness on each side of the enlarged zone of the component need not be identical. The enlargement need to be thus present only adjacent that zone of the structural component which adjoins the intended locations of breakage which, in the illustrated embodiment, would be the part facing the zone 10. Thus, the zone 14 of the septum 4 extending to the right of the enlarged portion 8 may have the same thickness as the enlargement 8. In such a case thus the enlargement is obtained by simply making the right-hand part of the separating wall thicker than the left-hand part (as viewed in FIG. 2). It is further noted that the enlarged part at the cavity need not necessarily have a circular cross section; the cross-sectional configuration in each instance may be set by the manufacturing possibilities determined largely by the size of the structural component.

Figure 3:
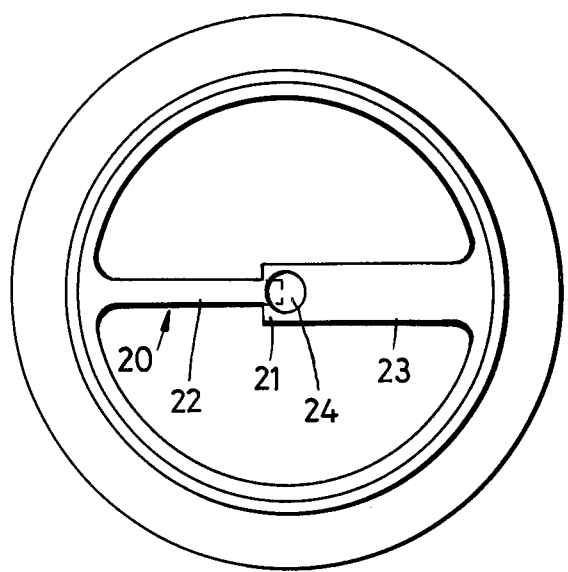
FIG. 3 shows the same view as FIG. 2 of another embodiment.

In the embodiment shown in FIG. 3 the septum 20 has an abrupt change at 21 from a relatively small thickness (at 22) to a relatively large thickness (at 23). This zone of abrupt change forms the enlargement. Near said zone the elongated cavity 24 is situated.

It will be understood that the above description of the present invention is susceptible to various modifications, changes and adaptations, and the same are intended to be comprehended within the meaning and range of equivalents of the appended claims.

What is claimed is:

1. In a wall-like component being supported at opposite ends and exposed to thermal stresses, the improvement comprising
   (a) an elongated bilateral enlargement extending substantially parallel to a plane in which the component lies; said enlargement being oriented substantially perpendicularly to an imaginary distance line between said opposite ends;
   (b) means defining an elongated cavity extending within and codirectionally with said enlargement; said cavity being offset with respect to said enlargement in the direction of one of said ends of said component; said cavity having a dimension measured in a direction perpendicular to said plane; said dimension being greater than the thickness of a component portion adjoining said enlargement, whereby upon breakage of parts of said enlargement under the effect of forces derived from heat-caused expansion of the component, there being obtained a free edge of said component portion and a trough-like part formed together by remaining parts of said enlargement and said cavity for receiving said free edge.

2. A component as defined in claim 1, wherein said enlargement and said cavity are circular in cross section.

3. A component as defined in claim 1, wherein said cavity is arranged substantially at one half of the distance between said opposite ends.

4. A component as defined in claim 1, wherein said component has an abrupt change from a relatively small thickness to a relatively large thickness; said enlargement being formed by the zone of abrupt change.

* * * * *